United States Patent [19]

Aoki

[11] Patent Number: 4,500,189

[45] Date of Patent: Feb. 19, 1985

[54] APPARATUS FOR DETECTING THE FOCUS CONDITION OF AN IMAGING LENS

[75] Inventor: Masahiro Aoki, Tokyo, Japan

[73] Assignee: Olympus Optical Co., Ltd., Tokyo, Japan

[21] Appl. No.: 537,026

[22] Filed: Sep. 29, 1983

[30] Foreign Application Priority Data

Oct. 4, 1982 [JP] Japan ................. 57-173293

[51] Int. Cl.³ .......................... G03B 7/08; G01J 1/20
[52] U.S. Cl. ................................... 354/407; 250/204
[58] Field of Search ............... 354/402, 404, 408, 409, 354/406, 407; 250/201, 201 PF, 204

[56] References Cited

U.S. PATENT DOCUMENTS 4,373,791  2/1983  Araki .................. 250/201 PF X

FOREIGN PATENT DOCUMENTS 0016410  1/1982  Japan .................. 354/408

Primary Examiner—William B. Perkey
Attorney, Agent, or Firm—Parkhurst & Oliff

[57] ABSTRACT

An apparatus for detecting a focus condition of an imaging lens of a still camera by detecting a lateral shift of two images formed on a light receiving element array by means of light fluxes transmitted through different sections of the exit pupil of the imaging lens divided by a stripe mask is disclosed. The variation of outputs from light receiving elements of the array due to an image height is corrected electrically by means of a correction circuit including first and second triangular wave generating circuits for generating first and second triangular waves having negative and positive inclinations, a clock pulse generator for producing clock pulses, a signal selection circuit for selecting alternately the first and second triangular waves in synchronism with the clock pulses to produce a correction signal, and a multiplying circuit for multiplying the outputs from the light receiving elements with the correction signal to provide a corrected signal from which the lateral shift can be detected accurately.

9 Claims, 16 Drawing Figures

FIG_8A 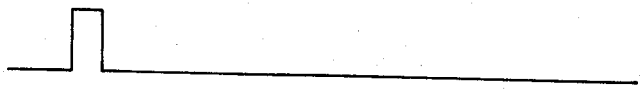
FIG_8B 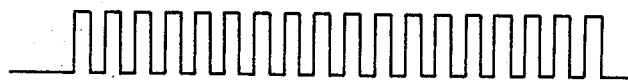
FIG_8C 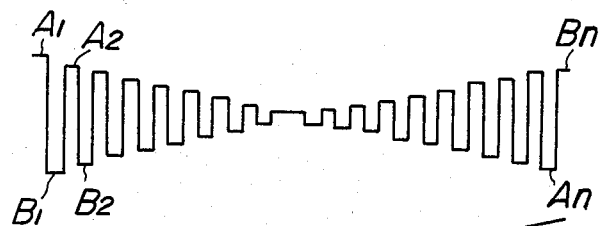
FIG_8D 
FIG_8E 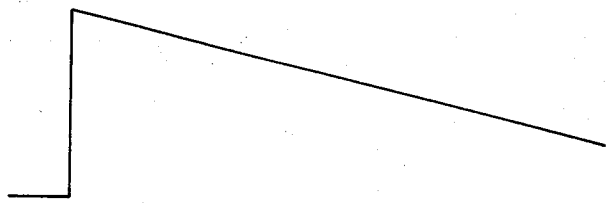
FIG_8F 
FIG_8G 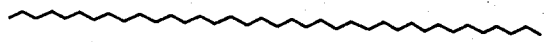

APPARATUS FOR DETECTING THE FOCUS CONDITION OF AN IMAGING LENS

BACKGROUND OF THE INVENTION

The present invention relates to an apparatus for detecting a focus condition of an imaging lens of an optical machine such as a still camera, cinecamera, video camera and microscope.

There have been proposed various focus detection systems. In one of the known systems the focus condition is judged by detecting the amount and direction of a lateral shift of two images formed by two light fluxes transmitted through different portions of an imaging lens. The present invention relates particularly to a focus detection apparatus for such a lateral shift detection system.

FIG. 1 is a schematic view showing an optical system of the focus detection apparatus of a lateral shift detection system. An exit pupil of an imaging lens 1 is divided into sections by means of a pupil dividing means 2 such as a stripe mask, a micro lens array and a micro prism array.

The divided pupil images are projected upon a light receiving element array 3 arranged in a predetermined focal plane or a plane conjugated therewith. It should be noted that the light receiving element array 3 may be arranged in the proximity of these planes.

The exit pupil images of the imaging lens 1 divided by the pupil dividing means 2 are projected on adjacent paired light receiving elements of the array 3 such that the divided images of the exit pupil of imaging lens 1 projected on first elements 3A-1, 3A-2 . . . 3A-n and those projected on corresponding second elements 3B-1, 3B-2 . . . 3B-n become coincident with each other in an in-focus condition, but are shifted in opposite directions in accordance with a direction of a deviation from the in-focus condition. Then, the focus condition is detected by processing outputs of the odd and even numbered light receiving elements.

In the known focus detection apparatus of a lateral shift detection system, the focus condition cannot be detected precisely due to image height. This will be explained in detail hereinbelow.

As illustrated in FIG. 2, it is now assumed that a distance between an exit pupil plane 6 of the imaging lens 1 and an image plane 5 is Lo, and a distance between an image point 5-1 of a point 4-1 of an object 4 and an optical axis 7 is x. The distance x is sometimes called the image height. Then, since a principal light ray 8 from the image point 4-1 is inclined with respect to the optical axis 7 by an angle $\alpha(x)=\tan^{-1}(x/L_o)$, the division rate of the exit pupil by means of the pupil dividing means 2 with respect to the paired light receiving elements varies dependent upon the distance x, i.e., the image height. Therefore, in the known focus detection apparatus, the focus condition could not be detected accurately.

Now the undesired influence of the image height will be further explained in detail with reference to FIG. 3.

In the known focus detection apparatus shown in FIG. 3, the exit pupil dividing means 2 comprises a stripe mask which includes light transmitting portions separated from each other by a pitch 2P. The light receiving element array 3 comprises light receiving elements spaced apart from each other by a pitch P. In FIG. 3, the light transmitting portions 2i, 2j of the stripe mask 2 and the light receiving elements 3A-i, 3B-i corresponding to the portion 2i and elements 3A-j and 3B-j corresponding to the portion 2j are shown for the sake of clearness. The paired elements 3A-i, 3B-i and 3A-j, 3B-j receive light fluxes transmitted mainly through different sections of the exit pupil of the imaging lens 1.

Now central points 2S-i and 2S-j of the light transmitting portions 2i and 2j are considered. The paired light receiving elements 3A-i and 3B-i on the optical axis 7 receive the images of the exit pupil of imaging lens 1 which are equally divided with respect to the central point 2S-i of the relevant light transmitting portion 2-i of the stripe mask 2. Contrary to this, the paired light receiving elements 3A-j and 3B-j receive exit pupil images which are not equally divided with respect to the central point 2S-j of the related light transmitting portion 2-j. That is to say, in accordance with the increase in the image height, one of the paired light receiving elements 3B-j receives a large light flux transmitted through a substantial portion of the exit pupil of imaging lens 1, but the other light receiving element 3A-j receives a small light flux transmitted through only a peripheral portion of the exit pupil of the imaging lens. Therefore, even when a wholly white object is imaged, outputs of the light receiving elements have a non-uniform distribution shown in FIG. 4. The outputs Ai and Bi are supplied from the elements 3A-i and 3B-i, respectively, corresponding to the light transmitting portion 2i having the central point 2S-i on the optical axis 7, and become equal to each other. However, the outputs $A_1$ and $B_1$ from the elements 3A-1 and 3B-1, respectively, and the outputs An and Bn from the elements 3A-n and 3B-n, respectively, corresponding to the light transmitting portions spaced apart from the optical axis 7, become different from each other. That is to say, the outputs $A_1$, $A_2$ . . . An of the odd numbered elements are gradually decreased, and the outputs $B_1$, $B_2$ . . . Bn of the even numbered elements are gradually increased.

Due to the above explained imbalance of the division rate, when the object has a step-like contrast as shown in FIG. 5A, envelopes of outputs from the odd and even numbered elements are not equal to each other, but are different from each other as illustrated by a broken curve A and a solid curve B in FIG. 5B. In this case, the apparatus could not detect the infocus condition accurately and thus the focus detection precision is low.

In order to eliminate the above mentioned problem, it has been proposed in Japanese Patent Application Laid-open Publication No. 130,524/80 that a correction lens be arranged between the imaging lens and the exit pupil dividing means to correct the inclination of the principle light ray of imaging lens due to the image height. FIG. 6 is a schematic view showing an optical system in which the correction lens is applied to the focus detection apparatus illustrated in FIG. 3. Between the imaging lens 1 and the stripe mask 2 a correction lens 9 is inserted for converting the light flux transmitted through the imaging lens 1 into a parallel light flux to correct the inclination of the principal light ray of the light flux due to the image height. However, this known solution has another drawback in that the correction lens is required in addition to the pupil dividing means, making the whole apparatus larger and more expensive. Also, the adjustment during manufacture becomes complicated and cumbersome.

SUMMARY OF THE INVENTION

The present invention has for its object to provide a focus detection apparatus in which the influence of the image height can be corrected electrically, thereby to obtain high precision in focus detection, so that the optical system can be made simple, small and less expensive.

According to the invention, an apparatus for detecting a focus condition of an imaging lens comprises means for dividing an exit pupil of the imaging lens into sections;

means comprising plural sets of paired light receiving elements arranged to receive light fluxes transmitted through the different divided exit pupil sections;

means for receiving output signals supplied from the light receiving elements and correcting variation in the output signals due to an image height to produce corrected signals;

means for processing the corrected signals to detect a lateral shift of two images projected on the light receiving elements; and means for detecting a focus condition of the imaging lens on the basis of the detected lateral shift.

In the focus detection apparatus according to the invention, the imbalance in the amount of light impinging upon the light receiving elements due to the image height can be corrected effectively by processing the outputs from the elements. Therefore, use can be made of the optical system without the correction lens, and therefore the optical system can be made simple, small and less expensive and further the focus condition can be detected accurately and with high precision. Further, the adjustment of the optical system can be made simple.

BRIEF DESCRIPTION OF THE DRAWINGS

FIGS. 8A to 8G are waveforms for explaining the operation of the focus detection apparatus shown in FIG. 7A,

DESCRIPTION OF THE PREFERRED EMBODIMENTS

Figure 1:
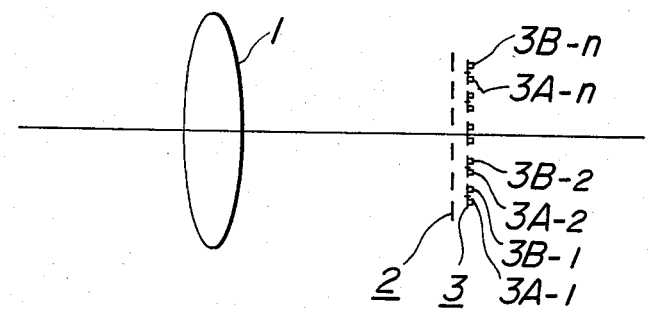
FIG. 1 is a schematic view illustrating a basic construction of an optical system of a focus detection apparatus of a lateral image shift detection system.
Figure 2:
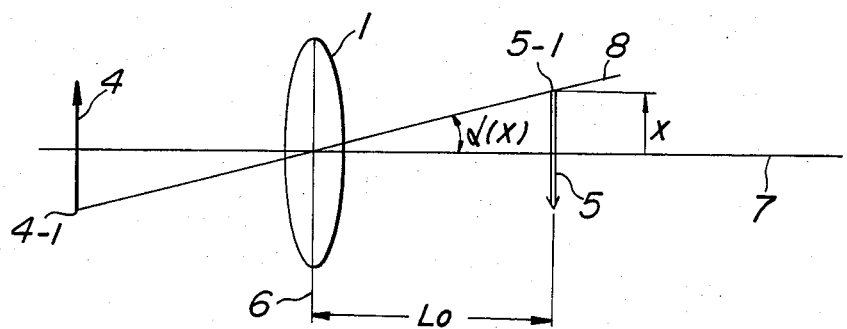
FIG. 2 is a schematic view for explaining an inclination of a principal light ray due to an image height.
Figure 3:
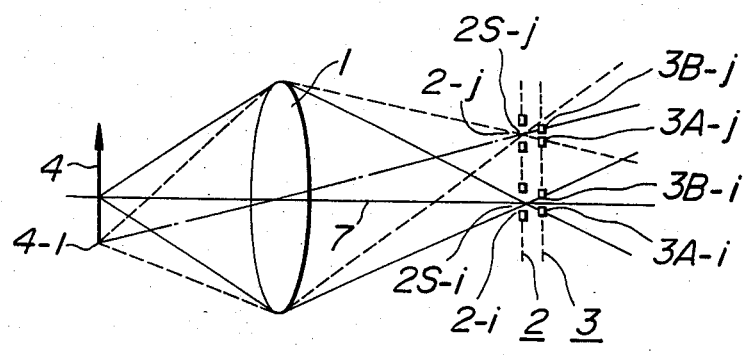
FIG. 3 is a schematic view for explaining an imbalance of light fluxes due to the image height.
Figure 4:
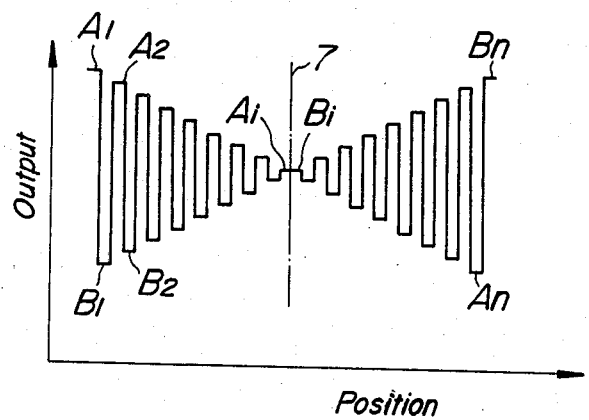
FIG. 4 shows a distribution of outputs from light receiving elements.
Figure 5A:
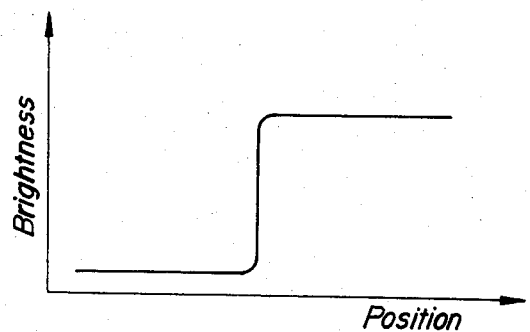
FIG. 5A illustrates an object having a step-like contrast and FIG. 5B shows the output from the light receiving elements.
Figure 5B:
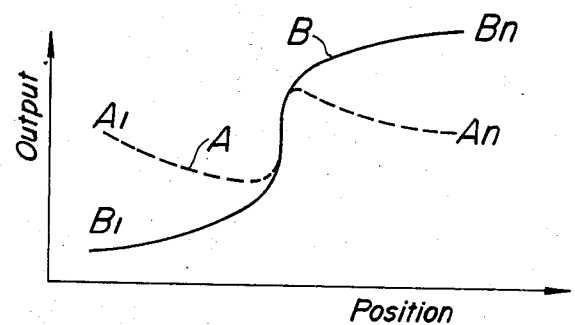
Figure 6:
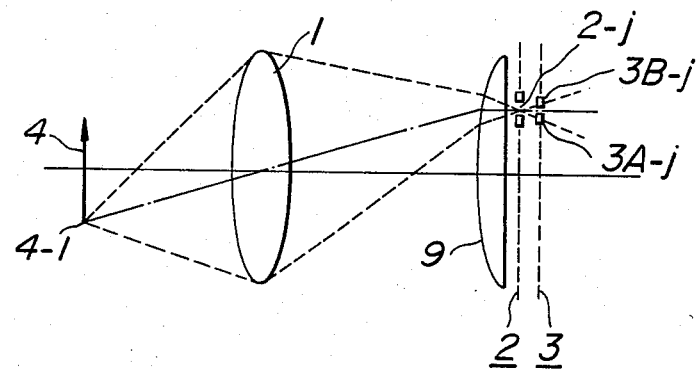
FIG. 6 is a schematic view depicting a known focus detection apparatus comprising a correction lens.
Figure 7:
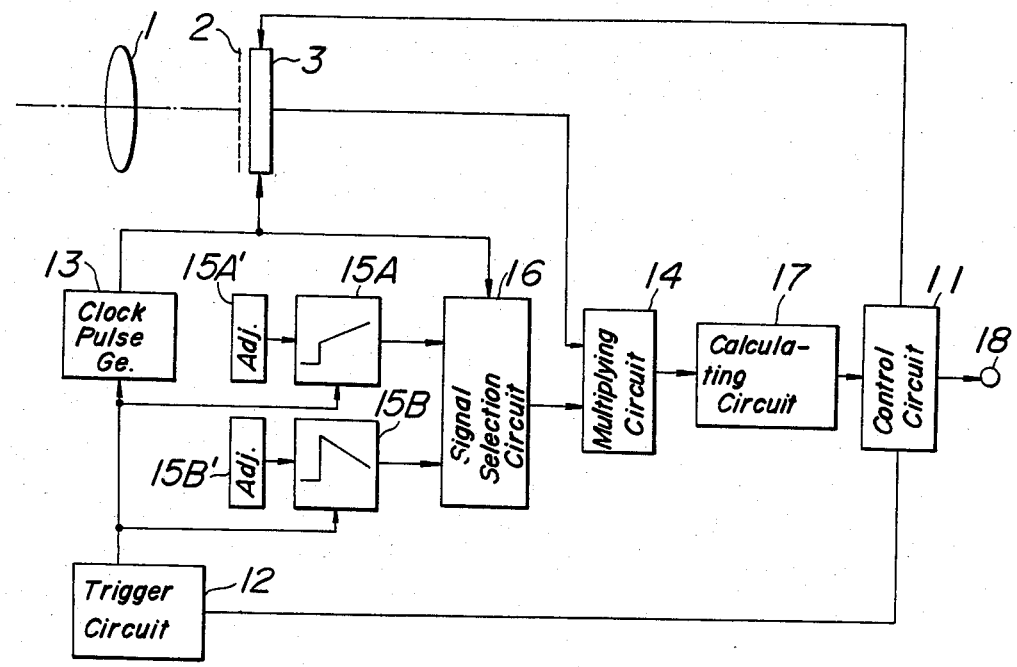
FIG. 7A is a block diagram illustrating an embodiment of the focus detection apparatus according to the invention.
FIG. 7B is a block diagram illustrating an alternative embodiment of the focus detection apparatus according to the invention.

FIG. 7A is a block diagram showing an embodiment of the focus detection apparatus according to the invention. In the present embodiment, an exit pupil of an imaging lens 1 is divided into sections by means of a pupil dividing means 2 and divided images of the exit pupil are projected upon a light receiving element array 3. The construction of the optical system is same as that shown in FIG. 1. The light receiving element array 3 is controlled by a control circuit 11 to sample and hold the outputs from the light receiving elements simultaneously. After that the control circuit 11 sends a command to a trigger circuit 12 to produce a trigger signal shown in FIG. 8A. In response to the trigger signal, a clock pulse generator 13 generates clock pulses illustrated in FIG. 8B. By means of the clock pulses thus generated, the sampled and held outputs of the light receiving elements are read out successively to one input terminal of a multiplying circuit 14.

In the present embodiment, the distribution of the outputs $A_1, A_2 \ldots A_n$ of the first elements has a negative inclination and that of the outputs $B_1, B_2 \ldots B_n$ of the second elements has a positive inclination as depicted in FIG. 8C.

The trigger signal produced from the trigger circuit 12 is also supplied to triangular wave generating circuits 15A and 15B to produce triangular waves having positive and negative inclinations as shown in FIGS. 8D and 8E, respectively, which are then supplied to a signal selection circuit 16 to which are also supplied the clock pulses from the clock pulse generator 13. In the signal selection circuit 16, the positive and negative triangular waves are alternately selected in synchronism with the clock pulses to produce a correction signal shown in FIG. 8F. The correction signal thus generated is supplied to the other input terminal of multiplying circuit 14. Then, in the multiplying circuit 14, the correction signal is multiplied with the outputs A and B from the odd and even numbered light receiving elements of the array 3.

The inclination and D.C. levels of the triangular waves are so set that the output from the multiplying circuit 14 for the successive light receiving elements have substantially the same amplitudes as shown in FIG. 8G when the image of a wholly white object is formed on the array 3. To this end, to the triangular wave generating circuits 15A and 15B are connected adjusting circuits 15A' and 15B', respectively, by means of which the inclination of the triangular waves is adjusted by changing a time constant, by varying a variable resistor, and/or capacitor and the D.C. level of the triangular waves is adjusted by changing an off-set voltage of a buffer amplifier. The adjustment of the triangular waves can be effected during the manufacturing steps by monitoring the outputs of the multiplying circuit 14 while the light receiving elements are uniformly exposed. After the adjustment has been finished, it is not necessary at all to readjust the triangular wave generating circuits 15A and 15B.

The output signal from the multiplying circuit 14 is further supplied to a calculating circuit 17 and is processed therein by any of the known processes manner. In the present embodiment, a value S is calculated as follows;

$$S = \sum_{k=2}^{n} (|A_k - B_{k-1}| - |A_{k-1} - B_k|)$$

wherein $A_k$ and $B_k$ represent the corrected outputs from first and second elements, respectively, of the k-th light receiving element pair. The calculated value S varies dependent upon the position of the imaging lens 1 with respect to the light receiving element array 3 and becomes zero in the in-focus condition. The polarity of the value S in the forwardly de-focussed condition becomes opposite to that in the backwardly de-focussed condition. The calculated value S is supplied to the control circuit 11 in which a focus signal representing the in-focus, forwardly and backwardly de-focussed conditions is generated. The focus signal thus generated is supplied to an output terminal 18 and can be further used to display the detected focus condition and/or to drive automatically the imaging lens 1 into the in-focus condition.

In the focus detection apparatus according to the invention, the outputs from the light receiving elements can be corrected electrically in such a manner that all the outputs become substantially equal to each other for a wholly white object, and thus the variation of the outputs from the light receiving elements due to the imbalance of the amount of incident light due to the image height can be corrected effectively. In this manner, the focus detection can always be effected precisely.

Figure 7B:
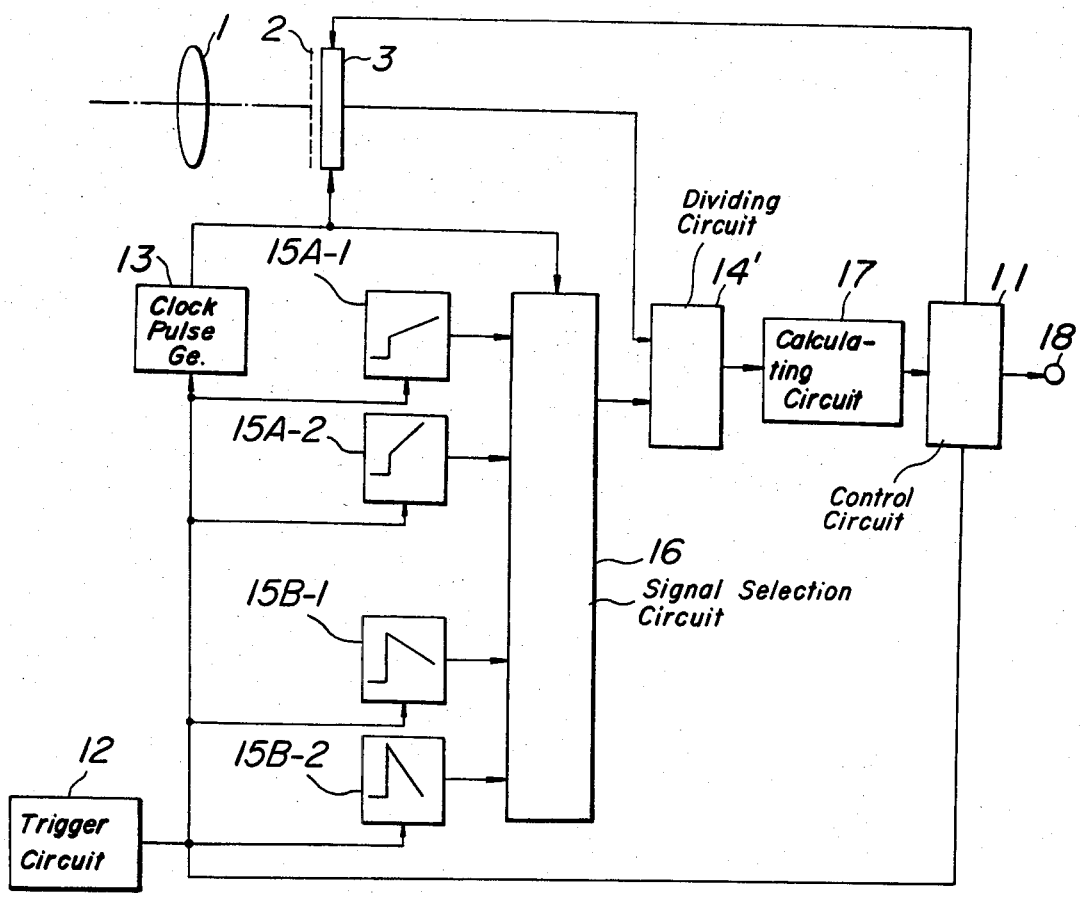

The present invention is not limited to the embodiment explained above, but many modifications and alternatives may be conceived within the scope of the invention. For instance, in the above embodiment, the variation of the exit pupil division rate is compensated for by multiplying the outputs from the first and second light receiving elements with the triangular waves having opposite inclinations. As shown in FIG. 7B, it is also possible to correct the variation by using a dividing circuit 14' to divide outputs from the elements by triangular waves having the same inclination polarity. Further, differences of the outputs with respect to a standard value for the wholly white object may be detected and stored and then the outputs from the light receiving elements can be corrected in accordance with the stored differences. In such a case, since any possible variation of respective light receiving elements can also be corrected, the focus detection precision can be further improved. Moreover, in the case where a plurality of imaging lenses are mounted detachably to the body, plural sets of triangular wave generating circuits 15A-1, 15A-2, 15-B-1, 15-B-2; corresponding to the imaging lenses may be provided and any one of them may be selectively used, depending upon the imaging lens to be used as also shown in FIG. 7B. It should further be noted that the adjusting circuits 15A' and 15B' may be controlled automatically or manually in accordance with the imaging lens to be used.

What is claimed is:

1. An apparatus for detecting a focus condition of an imaging lens comprising:
    means for dividing an exit pupil of the imaging lens into sections;
    means comprising plural sets of paired light receiving elements arranged to receive light fluxes transmitted through the different divided exit pupil sections;
    means for generating a correction signal for eliminating the influence of an image height;
    means for receiving said correction signal and for receiving output signals supplied from the light receiving elements and correcting variation in the output signals due to an image height to produce corrected signals;
    means for processing the corrected signals to detect a lateral shift of two images projected on the light receiving elements; and
    means for detecting a focus condition of the imaging lens on the basis of the detected lateral shift.

2. An apparatus according to claim 1, wherein said correction signal generating means comprises:
    first and second triangular wave generating circuits for generating first and second triangular waves having negative and positive inclinations, respectively;
    a clock pulse generator for producing a clock pulse for successively reading out the outputs from the paired light receiving elements; and
    a signal selection circuit for selecting alternately said first and second triangular waves in synchronism with the clock pulses to produce a correction signal;
    and wherein said correction signal receiving means comprises a multiplying circuit for multiplying the outputs from the light receiving elements with the correction signal to produce the corrected signal.

3. An apparatus according to claim 2, wherein said correction signal generating means further comprises a trigger circuit for producing a trigger signal for simultaneously triggering the first and second triangular wave generating circuits and the clock pulse generator.

4. An apparatus according to claim 2, wherein said correction signal generating means further comprises first and second adjusting circuits connected to the first and second triangular wave generating circuits, respectively, for adjusting the inclination and D.C. levels of the first and second triangular waves.

5. An apparatus according to claim 2, wherein said correction signal generating means comprises plural sets of the first and second triangular wave generating circuits for generating plural sets of the first and second triangular waves having different inclination angles and D.C. levels.

6. An apparatus according to claim 1, wherein said correction signal receiving means comprises:
    first and second triangular wave generating circuits for generating first and second triangular waves having negative and positive inclinations, respectively;
    a clock pulse generator for producing a clock pulse for successively reading out the outputs from the paired light receiving elements; and
    a signal selection circuit for selecting alternately said first and second triangular waves in synchronism with the clock pulses to produce a correction signal;
    wherein said correction signal receiving means comprises a dividing circuit for dividing the outputs from the light receiving elements by the correction signal to produce the corrected signal.

7. An apparatus according to claim 1, wherein said correcting signal receiving means comprises a multiplying circuit for multiplying the outputs from the light receiving elements with the correction signal to produce the corrected signal.

8. An apparatus according to claim 1, wherein said correction signal receiving means comprises a dividing circuit for dividing the outputs from the light receiving elements by the correction signal to produce the corrected signal.

9. An apparatus according to claim 1, wherein said correction signal generating means comprises:
    first and second triangular wave generating circuits for generating first and second triangular waves having negative and positive inclinations, respectively;

a clock pulse generator for producing a clock pulse for successively reading out the outputs from the paried light receiving elements; and a signal selection circuit for selecting alternately said first and second triangular waves in synchronism with the clock pulses to produce a correction signal.

* * * * *